United States Patent
Battaglini et al.

(10) Patent No.: US 10,060,578 B2
(45) Date of Patent: Aug. 28, 2018

(54) AUTOMATED GAS DETECTION AND REPORTING SYSTEM

(71) Applicant: International Business Machines Corporation, Armonk, NY (US)

(72) Inventors: Roberto Battaglini, Miami, FL (US); Jeremy R. Fox, Georgetown, TX (US); Leo Kluger, Spring Valley, NY (US); William J. Reilly, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 144 days.

(21) Appl. No.: 15/156,055

(22) Filed: May 16, 2016

(65) Prior Publication Data

US 2017/0328522 A1    Nov. 16, 2017

(51) Int. Cl.
*F17D 5/06* (2006.01)
*G01M 3/24* (2006.01)
(Continued)

(52) U.S. Cl.
CPC .............. *F17D 5/06* (2013.01); *G01M 3/243* (2013.01); *H04B 1/38* (2013.01); *H04L 67/12* (2013.01)

(58) Field of Classification Search
CPC .... F17D 5/00; F17D 5/02; F17D 5/06; G01M 3/24; G01M 3/243; H04B 1/38; H04L 67/12
See application file for complete search history.

(56) References Cited

U.S. PATENT DOCUMENTS

| 5,103,675 A | * | 4/1992 | Komninos | ............... | G01M 3/24 381/98 |
| 5,780,724 A | * | 7/1998 | Olender | .................. | G01M 3/38 73/24.01 |

(Continued)

FOREIGN PATENT DOCUMENTS

| CN | 101641723 B | 12/2011 |
| CN | 102298636 B | 5/2013 |

(Continued)

OTHER PUBLICATIONS

Bennets et al., "Combining Non Selective Gas Sensors on a Mobile Robot for Identification and Mapping of Multiple Chemical Compounds", Sensors 2014, 14, 17331-17352.

(Continued)

*Primary Examiner* — Nguyen Ha
(74) *Attorney, Agent, or Firm* — Cahn & Samuels, LLP

(57) ABSTRACT

An embodiment of the invention provides a method for monitoring for and detecting a leak in a line where a mobile detector having an audio sensor and an odor sensor transiting along the line. A sample audio reading is obtained by the audio sensor; and, a sample odor reading is obtained by the odor sensor. A processor compares the sample audio reading to a baseline audio reading to determine whether the line is leaking. The processor compares the sample odor reading to a baseline odor reading to determine whether the line is leaking. The location of the mobile detector is identified by a GPS device on the mobile detector when the processor determines that the line is leaking. The location of the mobile detector, the sample audio reading, and the sample odor reading is sent to a central monitoring center by a communications device on the mobile detector.

19 Claims, 6 Drawing Sheets

(51) Int. Cl.
*H04B 1/38* (2015.01)
*H04L 29/08* (2006.01)

(56) References Cited

U.S. PATENT DOCUMENTS

| | | | |
|---|---|---|---|
| 6,385,558 | B1 | 5/2002 | Schlemm |
| 7,584,045 | B2 | 9/2009 | Peretz |
| 8,269,640 | B2 | 9/2012 | Ueno et al. |
| 8,548,036 | B2 | 10/2013 | Umehara et al. |
| 8,718,124 | B2 | 5/2014 | Umehara et al. |
| 2008/0179199 | A1* | 7/2008 | Coignet ............ G01N 27/4074 205/793 |
| 2012/0279599 | A1* | 11/2012 | Gluskin ................ G01N 17/00 138/97 |
| 2013/0066568 | A1* | 3/2013 | Alonso .................... F17D 5/06 702/51 |
| 2013/0199272 | A1 | 8/2013 | Khalifa et al. |
| 2014/0002639 | A1 | 1/2014 | Cheben |
| 2014/0146161 | A1 | 5/2014 | Sibai |
| 2015/0007638 | A1 | 1/2015 | Rella |
| 2015/0234387 | A1 | 8/2015 | Mullan |
| 2016/0216363 | A1* | 7/2016 | Martin ..................... G01S 3/801 |
| 2017/0076563 | A1* | 3/2017 | Guerriero ......... G06F 17/30424 |
| 2017/0234757 | A1* | 8/2017 | Wang ...................... G01M 3/04 340/539.1 |

FOREIGN PATENT DOCUMENTS

| | | | | |
|---|---|---|---|---|
| CN | 104315348 | A * | 1/2015 | .............. F17D 5/02 |
| CN | 104333886 | A | 2/2015 | |
| CN | 204140362 | U | 2/2015 | |
| CN | 104655222 | A | 5/2015 | |
| CN | 105805560 | A * | 7/2016 | .............. F17D 5/06 |
| EP | 000522200 | A2 | 1/1993 | |
| EP | 0942274 | A2 * | 9/1999 | ........... G01M 3/002 |
| JP | 3013274 | B2 | 2/2000 | |
| JP | 2011135555 | A | 7/2011 | |
| WO | 2012072812 | A1 | 6/2012 | |
| WO | 2013116087 | A1 | 8/2013 | |

OTHER PUBLICATIONS

Hadi et al., "Design and Implement a Gas Pipeline Inspection System using Robotic Vehicle", Journal of Information Engineering and Applications, vol. 4, No. 9, 2014.
Intel, "Technologies Mimic the 5 Senses to Monitor Pipelines", Oct. 29, 2014.
Barnes & Noble webpage, "Gas Pipeline Inspection System Using Mobile Robot and GPS" by Wael et al., http://www.barnesandnoble.com/w/gas-pipeline-inspection-system-using-mobile-robot-and-gps-abdulmajeed-wael/1117405757.
English Abstract of CN 101641723, Dec. 14, 2011.
English Abstract of CN 102298636, May 15, 2013.
English Abstract of CN 104333886, Feb. 4, 2015.
English Abstract of CN 104655222, May 27, 2015.
English Abstract of CN 204140362, Feb. 4, 2015.
English Abstract of JP 3013274, Feb. 28, 2000.
English Abstract of JP 2011135555, Jul. 7, 2011.

* cited by examiner

AUTOMATED GAS DETECTION AND REPORTING SYSTEM

BACKGROUND

In the chemical and petroleum, public sector and transportation industries, minor leaks can occur in pressurized vessels, such as tanks and industrial pipelines. If undetected, these leaks can pass through successive failure modes, grow larger, and potentially lead to catastrophic explosions.

SUMMARY OF THE INVENTION

An embodiment of the invention provides a method for monitoring for and detecting a leak in a line where a mobile detector having an audio sensor and an odor sensor transiting along the line. A sample audio reading is obtained by the audio sensor; and, a sample odor reading is obtained by the odor sensor. A processor compares the sample audio reading to a baseline audio reading to determine whether the line is leaking. The processor compares the sample odor reading to a baseline odor reading to determine whether the line is leaking. The location of the mobile detector is identified by a GPS device on the mobile detector when the processor determines that the line is leaking.

The location of the mobile detector, the sample audio reading, and the sample odor reading is sent to a central monitoring center by a communications device on the mobile detector, where the sample audio reading includes a frequency and a duration. An electronic database of sample audio readings, sample odor readings, and leak events is maintained and analyzed to identify leak trends. Timing and location of future leaks is predicted based on the analysis of the electronic database.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
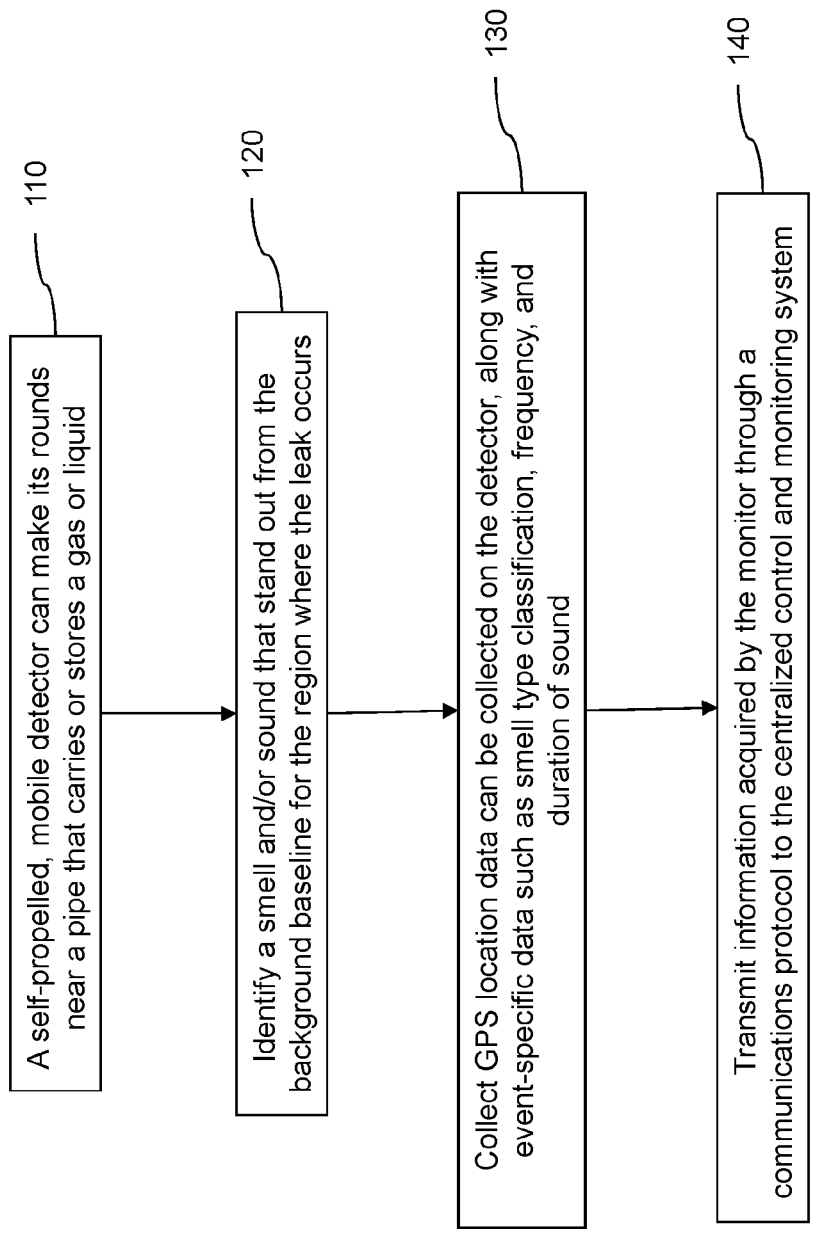
FIG. 1 is a flow diagram illustrating a method for automated gas detection and reporting according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

The present invention relates to systems, methods, and computer program products for automated gas detection and reporting. When a leak is minor, it can be a manageable challenge that can be repaired with few complications and minimal danger. At least one embodiment of the invention provides a system that uses several different sensing devices to enable early detection of gas leakages, including the detection of leaking gas via sound and odor. The system can include an array of portable or mobile "Internet of Things" sensors to detect smells and noise, GPS for location services, and a form of communication to transfer and report data acquired from the scent and sound detection to a centralized control and monitoring system.

Centralized monitoring and control can be accomplished via a dashboard that continuously and automatically collects, processes, monitors, interprets, portrays and visualizes data received from devices and sensors included in the system. The dashboard can subsequently enable automatic or manual analyses of data from the system.

The dashboard can receive data as a destination node in a cloud-based solution, and can therefore be monitored and controlled from any global location. By using a cloud-based dashboard, the system can scale and perform incremental monitoring functions in numerous locations. By locating one instance of the dashboard in a regional or global command center, additional analytics can further mine and interpret data at the record or other levels.

A centralized monitoring system can also include automatic control systems that respond to received and managed signals. The responses can control remote actuators that shut down gas flows, for example, or can automatically trigger various audio or visual alarm systems.

With the ability to detect leaking gases early in the failure cycle, and thus prevent gas-leak catastrophes, safety, productivity and security may be increased, and waste and overall energy consumption may be decreased. The system can monitor and detect the location of gas leaks at any point along a gas pipeline. The system can also detect gas leaks within homes and businesses. In addition, the system can detect and alert operators of leaks occurring in an urban steam supply pipe used to enable the movement of high-pressure steam from a steam-generation plant to, for example, individual homes, businesses, and different buildings in a campus setting.

In at least one embodiment of the invention, a mobile detection system continually roams along the length of a gas pipeline, using both gas and sound sensors to monitor for and detect leaks. If a leak is detected, the system can use a GPS system or cell tower triangulation to identify the location and communicate leak and geospatial details to the centralized control and monitoring system (also referred to herein as the "central monitoring center").

In another embodiment, the system is located on or near a tank, which can be in a fixed location, such as a warehouse or factory, or aboard a ship, train, truck, or other moving vessel. The system can include gas and sound sensors to monitor for and detect leaks; and, if a leak is detected, the system can use the GPS system to identify the location and communicate leak and geospatial details to the centralized control and monitoring system.

In yet another embodiment, the detection system is located in a fixed location and uses gas and sound sensors to monitor for and detect leaks. If a leak is detected, the system can use the GPS system to identify the location and communicate leak and geospatial details to the centralized control and monitoring system, or a correlation of the device's identification tag with a lookup table can identify the device's (and the leak's) location.

FIG. 1 is a flow diagram illustrating a method for automated gas detection and reporting according to an embodiment of the invention. A self-propelled, mobile detector can make its rounds near a pipe that carries or stores a gas or liquid 110. The detector can be autonomous and pre-programmed or controlled by a human operator in real-time. The detector can run on a track or follow a travel pattern near a target series of pipes or containers, or the detector can be located in a fixed location on or near a pipe. The detector can include a first sensor that actively takes samples of the air and a second sensor that monitors audio frequencies to detect any out-of-the-ordinary events in real-time. As gas under pressure escapes through a hole, a characteristic whistling sound can be detected. The frequency of that whistle can be too high, too low, or too low-energy to be detected by humans. However, electromechanical sensors can detect sounds both above and below average human ranges, or sounds too soft to be detected by unenhanced human ears.

When a leak occurs, the odor and sound sensors on the detector can identify a smell and/or sound that stand out from the background baseline for the region where the leak occurs 120. GPS location data can be collected on the detector, along with event-specific data such as smell type classification, frequency, and duration of sound 130. Each detector can have a unique identification number that can be associated with other collected and reported data elements Information acquired by the monitor can be transmitted through a communications protocol to the centralized control and monitoring system 140. The form of communication could include wired, wireless, Wi-Fi, Bluetooth, cellular, satellite, RFID, NFS, or any other form of disruption-resilient communication(s) protocol. Reporting of the event could produce multiple notifications as defined by the user or entity providing the monitoring service.

In at least one embodiment, events (e.g., identification of a leak) are trended across various monitoring systems, which can provide a network of monitoring to track events (e.g., a series of terrorist attacks on gas-bearing infrastructure). Other uses of analytics can include identifying a trend of successive leaks, either time-based or physically proximate, to enable prediction of the timing and location of future failures, to enable proactive preventative maintenance. Additional applications of analytics can include prioritization of leaks for scheduled repairs based on analyses of leakage flow rate as determined by sound frequency.

Figure 2:
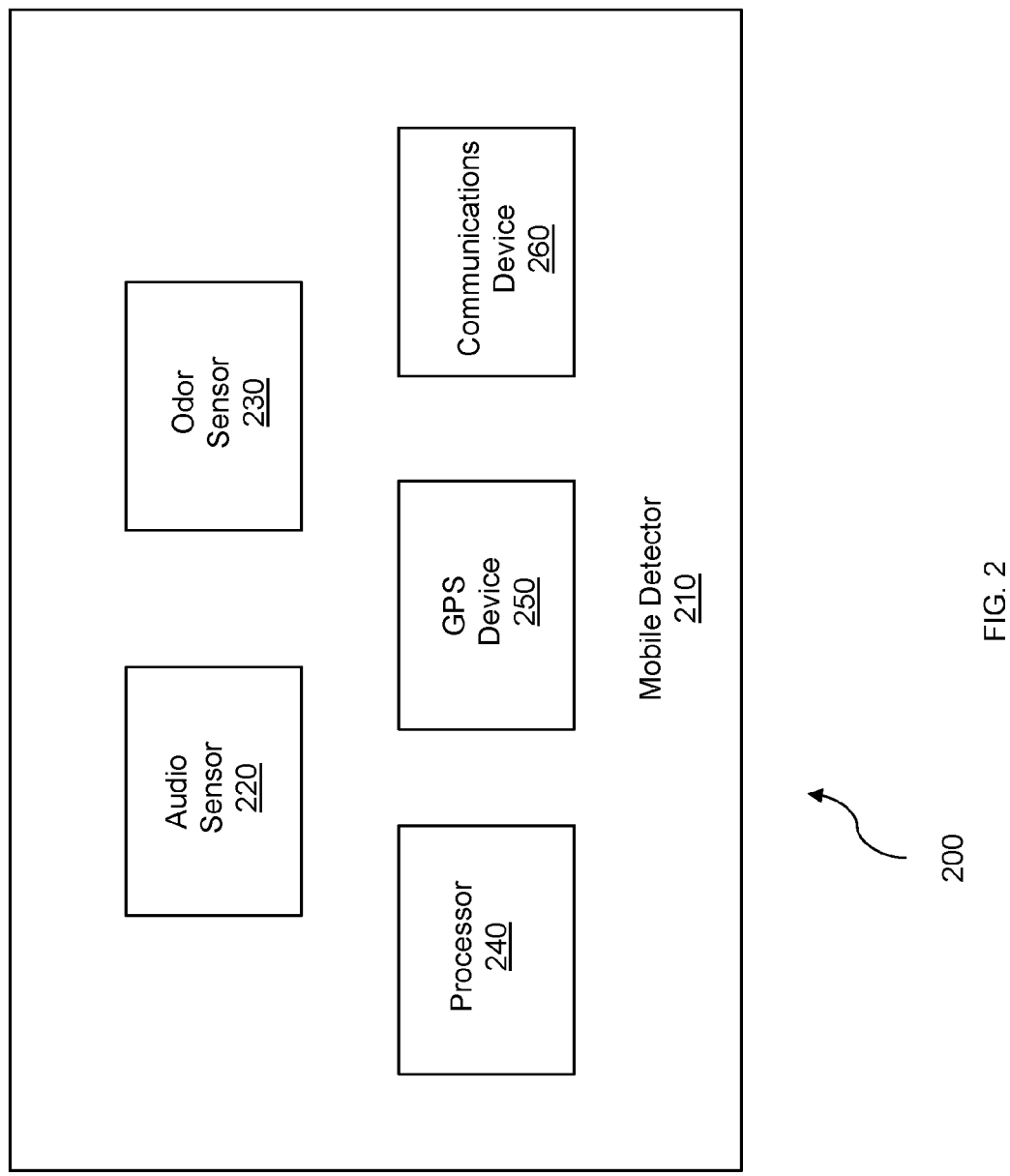
FIG. 2 is a diagram illustrating a system for monitoring for and detecting leaks in a line according to an embodiment of the invention.
Figure 3:
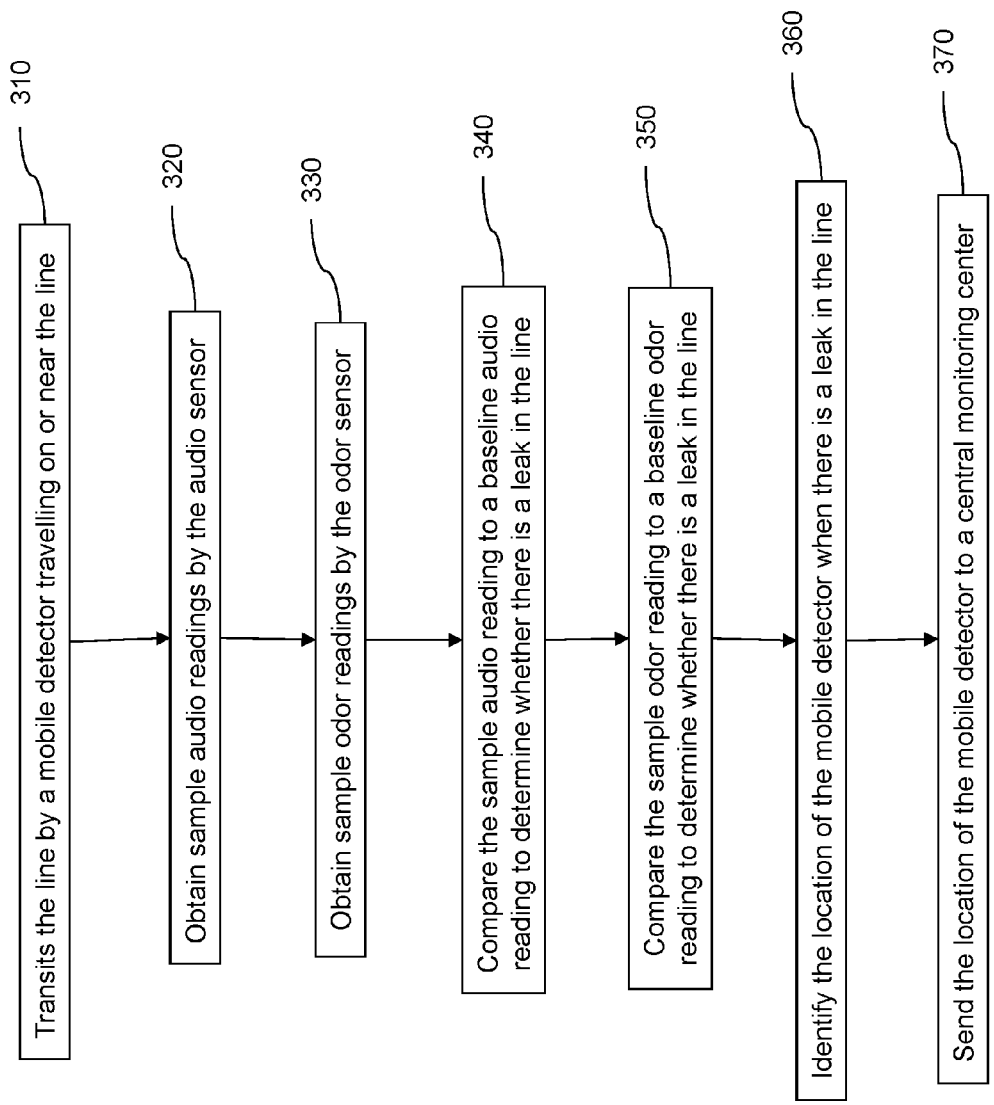
FIG. 3 is a flow diagram illustrating a method for monitoring for and detecting leaks in a line according to an embodiment of the invention.

FIG. 2 is a diagram illustrating a system 200 for monitoring for and detecting leaks in a line according to an embodiment of the invention. As used herein, the term "line" (also referred to herein as a "pipeline" or "vessel") includes any container for containing liquid or gas. FIG. 3 is a flow diagram illustrating a method 300 for monitoring for and detecting leaks in a line according to an embodiment of the invention (e.g., using the system 200).

In at least one embodiment, a mobile detector 210 having an audio sensor 220 and an odor sensor 230 transits the line by travelling on or near the line (310). Sample audio readings can be obtained by the audio sensor 210 (320); and sample odor readings can be obtained by the odor sensor (330).

A processor 240 connected to the audio sensor 220 and the odor sensor 230 can compare the sample audio reading to a baseline audio reading to determine whether there is a leak in the line (340). As used herein, the term "processor" includes a computer hardware device, such as, for example, a central processing unit (CPU), an integrated circuit, or a microprocessor. As used herein, the term "connected" includes operationally connected, logically connected, in communication with, physically or wirelessly connected, engaged, coupled, contacts, linked, affixed, and attached. Although FIG. 2 shows the processor 240 in the mobile detector 210, the processor 240 can be physically separate from the mobile detector and in wireless communication with the mobile detector 210. When the sample audio reading differs from the baseline audio reading by a threshold degree, the processor 240 can determine that a leak is present.

Pressurized gas leaking from a pipe can generate ultrasonic sounds and frequencies below 20 kHz. The audio sensor 220 can include a single microphone or a beamforming microphone array to detect and localize leaking compressed gas emitting sound energy in the audible frequency range. The beamforming approach can increase the ability to detect gas leaks in noisy ambient environments, which may be common in field conditions. In at least one embodiment, the beamforming approach identifies the specific locations on a line where a given leak occurs, as long as the audio sensor 220 remains stationary at a given location on the pipe for a period of time.

The beamforming algorithm can use a delay-and-sum approach in the time domain to localize a leak. Through electronic steering, the microphone array can be iteratively pointed in different directions, where the microphone array can collect audio signals and quantify their relative power. When the microphone array is pointed toward a leak (a sound source), the audio signal may be greater than when the microphone array is turned away from the sound source. The leak can therefore be precisely localized by identifying the direction that maximizes the audio signal.

During operation, the microphone array can be routinely focused on a pre-determined pattern (e.g., a coordinate grid with intersections every 3 cm by 3 cm) across the line surface proximate to the mobile detector 210. Relative signal time delays between microphones can be calculated. The signals recorded by the microphones can be compensated for each focus point by the associated propagation delay, summed, and normalized by the number of microphones. These analyses can enable the system 200 to pinpoint distances to the actual leak. Time domain beamforming can also detect and identify transient leaks, such as leaks that occur only during extreme temperatures, leaks that are temporarily plugged through weather-related phenomenon, and/or leaks that come and go due to gross mechanical movements, such as during earthquakes, as a result of nearby explosions, or due to momentary collisions when for example a moving vehicle or object or animal hits the line.

The system 200 can use analog technologies operating in the frequency range of approximately 20 Hz-20 kHz to detect, capture, and retain sounds surrounding the area proximate to the line. A converter stage can transform the analog signal to a digital format, with a sampling frequency of a minimum of 96 kHz, which can be stored and subsequently processed in a local or cloud-based database for subsequent analyses.

The system 200 can have an initial learning phase of a minimum of 24 hours, although an operator could set the learning phase duration to a shorter period. During the learning phase, the processor 240 can evaluate the digital representation of the ambient sounds nearby the line from the samples taken. The processor 240 can average and quantify ambient sounds. The numeric representation of an average set of sounds across the 24-hour period can be stored in a computing system either onboard the mobile detector 210 or based on a remote server and accessed via a wireless communication system to the cloud. This numeric representation can be used as the baseline audio reading.

When the system 200 is fully operational, all ambient event sounds (potential leaks) detected by the audio sensor 220 can be converted from analog to digital, processed, characterized, and quantified. The digital signals can be further converted via Fast Fourier Transform (FFT) techniques, which can generate frequency spectra characteristic of the different types of leaks. After the FFT, the frequency representation of the ambient noise signals can be algorithmically compared to that of the baseline audio reading. This comparison can occur in real time or non-real time, depending on the computational power available and the delay latency between the mobile detector 210 and the cloud-based computer, if a local CPU is not used.

If the differences between the sounds detected by the audio sensor 220 differ from that of the baseline audio reading by greater than 5%, a leak event can be logged. To reduce false positive readings from random, high-magnitude noise peaks, additional digital processing algorithms can be applied, such as linear or nonlinear filtering, the use of squared average distance techniques to compare the signal with a predefined threshold, and/or Hidden Markov Models, to improve the signal to noise ratios. A dump of the leak event log can be triggered by an operator, and/or can occur on a pre-set, periodic basis. The log output can be transmitted to a remote collection point for manual analysis and decision making.

In addition, the processor 240 can compare the sample odor reading to a baseline odor reading to determine whether there is a leak in the line (350). When the sample odor reading differs from the baseline odor reading by a threshold degree, the processor 240 can determine that a leak is present. The odor sensor 230 can include one or more inlet ports and a transport tube to convey a sample of the atmosphere to sensors tuned specifically to be sensitive to the specific gas being conveyed by the line being monitored. Airflow of suspect gas can be supported and increased by integrating a small fan into the transport tube.

In at least one embodiment, the at least one leak detected by comparing the sample audio reading to the baseline audio reading and the at least one leak detected by comparing the sample odor reading to the baseline odor reading are the same leak (e.g., one hole in the gas line). In another embodiment, the at least one leak detected by comparing the sample audio reading to the baseline audio reading and the at least one leak detected by comparing the sample odor reading to the baseline odor reading are different leaks (e.g., at least one two holes in the gas line).

Upon receiving confirmation of a suspected gas leak from the sample audio readings, the mobile detector 210 can pause in place while conducting additional gas detection tests to determine if a leak is present. In one embodiment, the odor sensor 230 can include a tunable diode laser absorption spectrometer (TDLAS) that measures the concentration of gas encountered by a laser beam, and also measures the gas pressure, which may further indicate the size and thus severity of the leak. The TDLAS can be tuned to the gas being carried by the pipe, to identify the absorption lines, or spectra, characteristic of the gas in question. Encountering those specific wavelengths reduces the intensity of the laser beam signal, as measured by a sensor in the TDLAS. The quantitative decrease in signal intensity can be algorithmically calculated to derive the average concentration of the leaking gas. If the signal intensity decreases by more than a threshold limit predetermined by an operator, an alert signal can be logged.

In another embodiment, the odor sensor 230 can include a conducting polymer gas sensor, wherein the measurand of conducting polymer sensors is the resistance of the surface layer, which includes a thin polymer film deposited between two gold electrodes by electrochemical polymerisation. The vapor-induced expansion of the polymer composite can cause an increase in electrical resistance when the sensor is exposed to the target gas. The resistance increase can be measured, detected, and translated into voltage changes through a circuit (e.g., a Wheatstone bridge). A precision voltmeter can subsequently quantify the presence of the target gas. Changes in the voltage levels, if they exceed a predetermined threshold set by an operator, can log an alert signal.

Conducting polymer gas sensors are suitable for field applications due to their ease of preparation, with a range of sensitivities for different organic gases. Conducting polymer gas sensors can operate at room temperature, leading to low power consumption, can have high discrimination, can operate reliably despite high relative humidity, and can have linear responses over a wide range of target gases. The occurrence of both a sound alert event and a gas alert event can assign additional priority to the operator to perform a manual investigation of the line.

When the processor 240 determines that there is a leak in the line, a GPS device 250 on the mobile detector 210 can identify the location of the mobile detector (360). The location of the mobile detector 210 can be sent to a central monitoring center by a communications device 260 on the mobile detector 210 (370). The communications device 260 can also send the sample audio reading and the sample odor reading to the central monitoring center, where the sample audio reading can include frequency and duration. The system 200 can also determine the smell type classification of the sample odor reading, and send the smell type classification to the central monitoring center by the communications device.

In at least one embodiment, electronic odor sensors, whether based on organic or inorganic technologies, or a combination of the two, signal the presence of one odor versus another through calibrated, unique, detectable and measurable changes in electronic currents and voltages, which are presented at a set of output terminals on the sensor device. Electronic odor sensing systems can further include programs that measure the output voltages, compare the measured set of output voltages to reference sets stored in a local or Cloud-based data storage device or system, and determine the identity of an odor molecule from the comparison.

In at least one embodiment, the system 200 maintains an electronic relational database of sample audio readings, sample odor readings, and leak events (determination of a leak in the line) from the mobile detector 210 or a group of mobile detectors 210. Leak events can include a hole, a crack, an incipient crack, a break in the pipe matrix, among other leak types. Each of these leaks could be large or small. Leaks can be graded and cataloged within the electronic database according to the Gas Piping and Technology Committee standards for grading gas leaks (Grade 1, Grade 2, or Grade 3).

The electronic database can be resident within the system 200 or remotely-accessed by the system 200 as a Cloud-based electronic database. The database can be used to log leak events, retain information about historical leaks found in a given line, and store data sourced from the array of sensors in the system 200. Leak specifics, including their grade and other salient characteristics, can be stored in the database as separate fields, where each leak event can be stored as a single line, a relational database record, or tuple. Suspected leak events (e.g., noted in the event log) can be stored in a different table within the electronic database, along with the variables. Other data can include recently captured and historical GPS-based location, data and time stamps, data from each one of the system-based sensors generating data, and/or other environmental variables accessed from the internet by the Cloud-based central server system. Other data to be stored in and accessed from the electronic database can include recently captured and historical audio signals, odor measurements, and leak events characteristic of different types of leaks.

GPS location data can be collected with every captured and historical event-specific metric, such as odor-type classification, frequency, and/or duration of sound. Each leak detection event can have a unique identifier recorded as a digital record stored in the electronic database, where the unique identifier can be associated with other collected and reported data elements. The electronic database can house other types of information regarding either a given leak or data describing the state of the line, including weather conditions at the time the leak was detected, the construction joint used in the line, the time duration since the line segment was manufactured, the time duration since the line segment was deployed, atmospheric conditions (e.g., factors corrosive to piping such as salt content, proximity to saltwater, frequency and duration of fog), internal pipeline pressure metrics, and/or vibration data (e.g., any motion-related data collected from line-based accelerometers, any motion data collected from other sensors).

The electronic database can also retain historical data regarding characteristic sounds emitted by different types of gases (e.g., combustible, flammable, and/or toxic gases), under varying atmospheric conditions, and escaping though a variety of leaks that the gas is escaping through. Other stored database fields can include the characteristic sounds and odors emitted by a gas based on their chemical footprint, metrics describing the air quality at various geographical regions near the line, and/or the atmospheric temperature near a pipe leak location.

In at least one embodiment of the invention, the electronic database is accessed on demand and analyzed (e.g., by a processor in the central monitoring center) to identify leak trends; and, the timing and location of future leaks is predicted based on the analysis of the electronic database. Predictive algorithms used by the system 200 can incorporate independent variables to predict the likelihood of a leak event within a given time frame, in a specific location of the pipe. Independent variables can be accessed from the electronic database, and can be combined with additional exogenous variables. The exogenous variables can be accessed either the internet via the Cloud-based server, or by accessing the internet directly through a wireless communication system. The predictive algorithms can be generated using candidate independent variables (e.g., obtained from historical data gathered by line sensors) and exogenous variables that reflect atmospheric and regional phenomenon, such as, for example, environmental events, geologic events, weather events, and/or line construction details.

Dependent variables can include the likelihood of a leak occurring given the states of the independent variables, and the approximate timeframe under which a leak might occur. These same independent variables can also be available by the computing system onboard the system 200 either through its internal database, or via a communications system to the cloud-based central server and database, and to the internet.

As the mobile detector 210 traverses the line, it can collect data using various sensors, in real time or near-real-time, and can also query the internet and/or storage database(s). The data fields queried or collected can be used as inputs to the predictive algorithm. The predictive algorithms can yield probability numbers that are mathematically translated and interpreted against predetermined thresholds set by an operator. If the results from the predictive algorithms indicate a strong likelihood of a leak event within a predetermined timeframe, the onboard or cloud-based computer can direct the mobile detector 210 to extend the duration of monitoring near the specific section of the line where the leak is predicted to occur.

The mobile detector 210 can be powered by rechargeable batteries, which can be by plugging into privately-maintained or commercially-available power sources. The batteries can also be charged via one or more solar panels mounted on the back of the mobile detector 210, in one or more various geometries including mounted flat on the surface of the mobile detector 210 and/or mounted in a fixed angle, similar to that of a butterfly's wings. Solar panels can be mounted on the mobile detector 210 as a motor-controlled, steerable array in both azimuth and altitude, able to dynamically assume an infinitely variable combination of azimuth and altitude, to maximize current and voltage produced by exposing the maximum amount of active surfaces of the solar panels to the sun's radiation.

The optimal set of angles to acquire the sun's radiation can be calculated by an algorithmic system controlled by the processor 240, or via a central computing system accessed remotely via the Cloud. Inputs into the algorithm used to optimize the solar panel geometry can include data from system-based sensors, including time of day, time of year, solar panel array current and voltage, wind speed and direction, ambient temperature, and/or humidity level. Additional inputs can include exogenous variables available from the Cloud-based computing system, and weather data and other environment factors, such as cloud coverage and surface-based dust levels.

In at least one embodiment, the processor 240 determines leakage flow rates of multiple leaks in the line based on the sample audio readings. Predictive analytics can also use the collected and stored data to predict the flow rates of leaks. The processor 240 can prioritize repairs of the leaks based on the determined leakage flow rates. For example, the processor 240 can determine that leak A has a flow rate of 2.3 liters/minute, leak B has a flow rate of 3.1 liters/minute, and leak C has a flow rate of 0.6 liters/minute; and, the processor 240 can assign the following priority to leak repairs: leak B, leak A, then leak C.

In addition, a sample temperature reading can be obtained by a thermometer on the mobile detector 210; and, the processor 240 can compare the sample temperature reading to a baseline temperature. The processor 240 can determine the presence of a leak when the sample temperature reading exceeds the baseline temperature by a threshold level. A sample humidity reading can be obtained by a hygrometer on the mobile detector 210; and, the processor 240 can compare the sample humidity reading to a baseline humidity. The processor 240 can determine the presence of a leak when the sample humidity reading exceeds the baseline humidity by a threshold level.

Temperature and humidity measurements from their respective sensors can be temporarily stored in the mobile detector 210 or stored in a cloud-based computing device, along with Geo-tag details for each measurement. Measurements could be taken every 10 feet, or at a different, pre-determined distance or time interval set by an operator. New temperature and humidity metrics from a given location can be algorithmically compared to the temperature and humidity metrics taken from the location just prior to the current position. If temperature and humidity numbers differ by more than 5% (or at a different, pre-determined level set by an operator) from one position to the other, then the processor 240 can log a suspected leak as a leak event in the mobile detector 210 or in a cloud-based computing device. All logged events can be evaluated and algorithmically compared with other event records to determine if a leak may have occurred in a given region.

The mobile detector 210 can also include an ambient air flow measuring system, which may help localize a given gas leak. The direction and intensity of ambient airflows can help the system 200 identify the relative region where a gas leak may have occurred. This analysis can include calculating the difference between the gas intensity measured downwind from a suspected gas leak versus the gas intensity measured upwind to the suspected gas leak. Comparative measurements can be made at right angles to the upwind and downwind directions, to further confirm the relative locale of the gas leak. If the gas intensity differs by wind direction by more than 5% (or at a different, pre-determined level set by an operator), then the system can log a suspected leak. All logged events can be algorithmically evaluated and compared with other event logs records to determine if a leak may have occurred in a given region.

The mobile detector 210 can also include a visual sensor to identify a possible fire on or near the line, where the visual sensor can identify a light source having a specific range of intensity and/or wavelength. Possible fire events can be logged in the local or cloud-based event log, for evaluation as a signal for manual intervention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
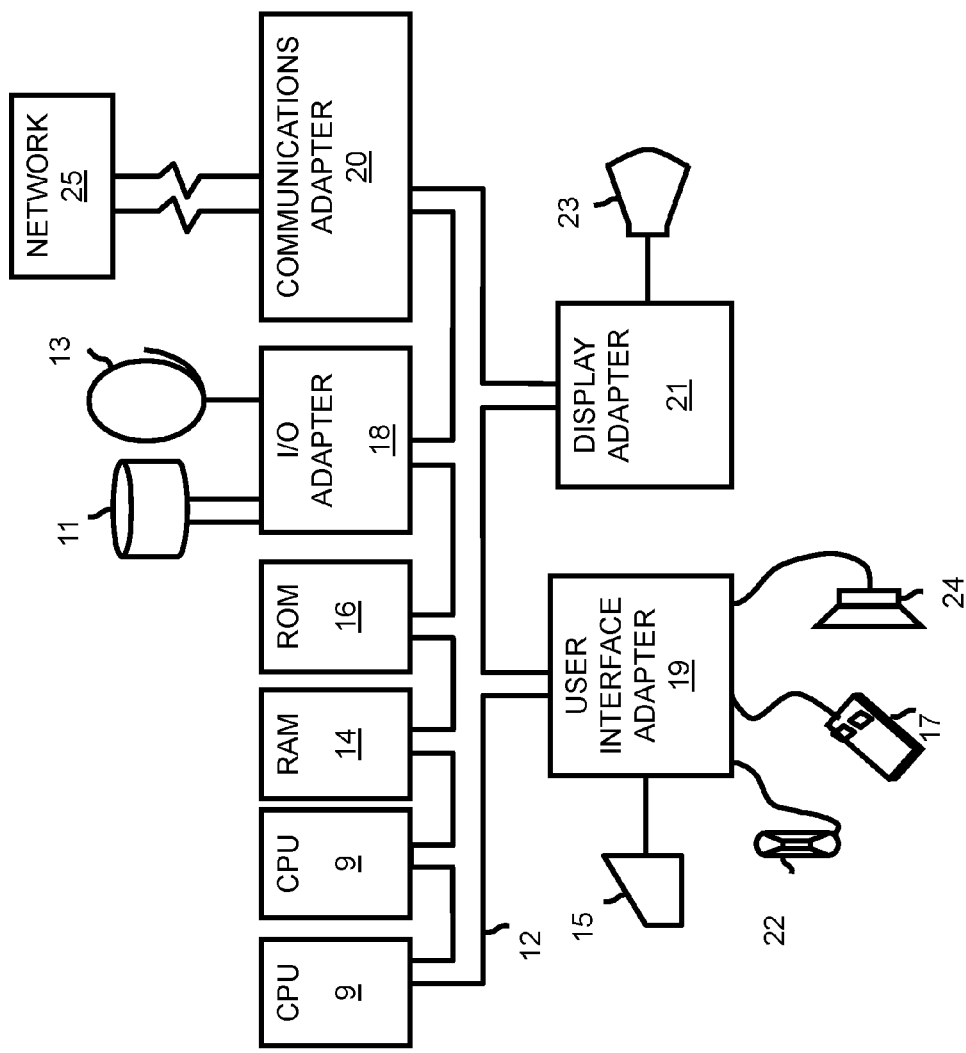
FIG. 4 is a diagram illustrating a computer program product for determining whether to authenticate a user according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 9. The CPUs 9 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
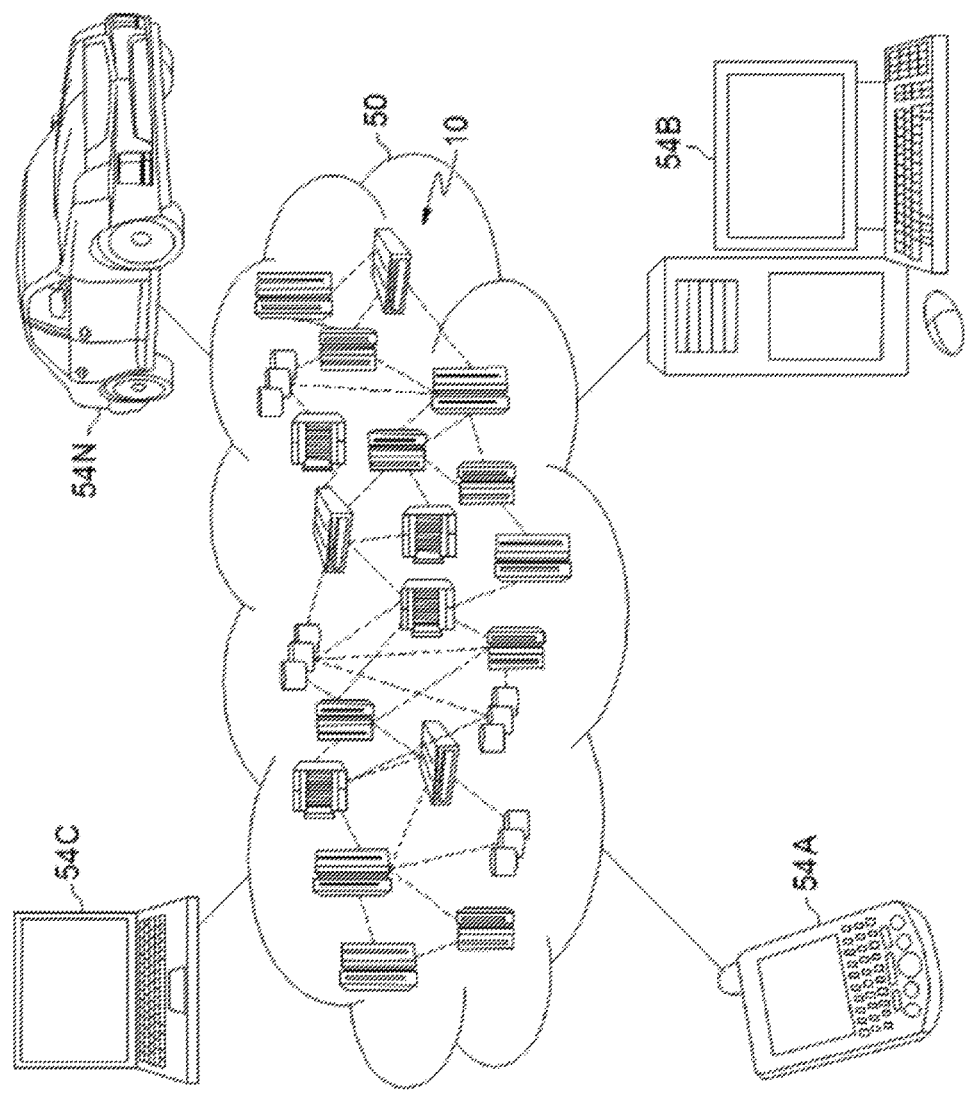
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
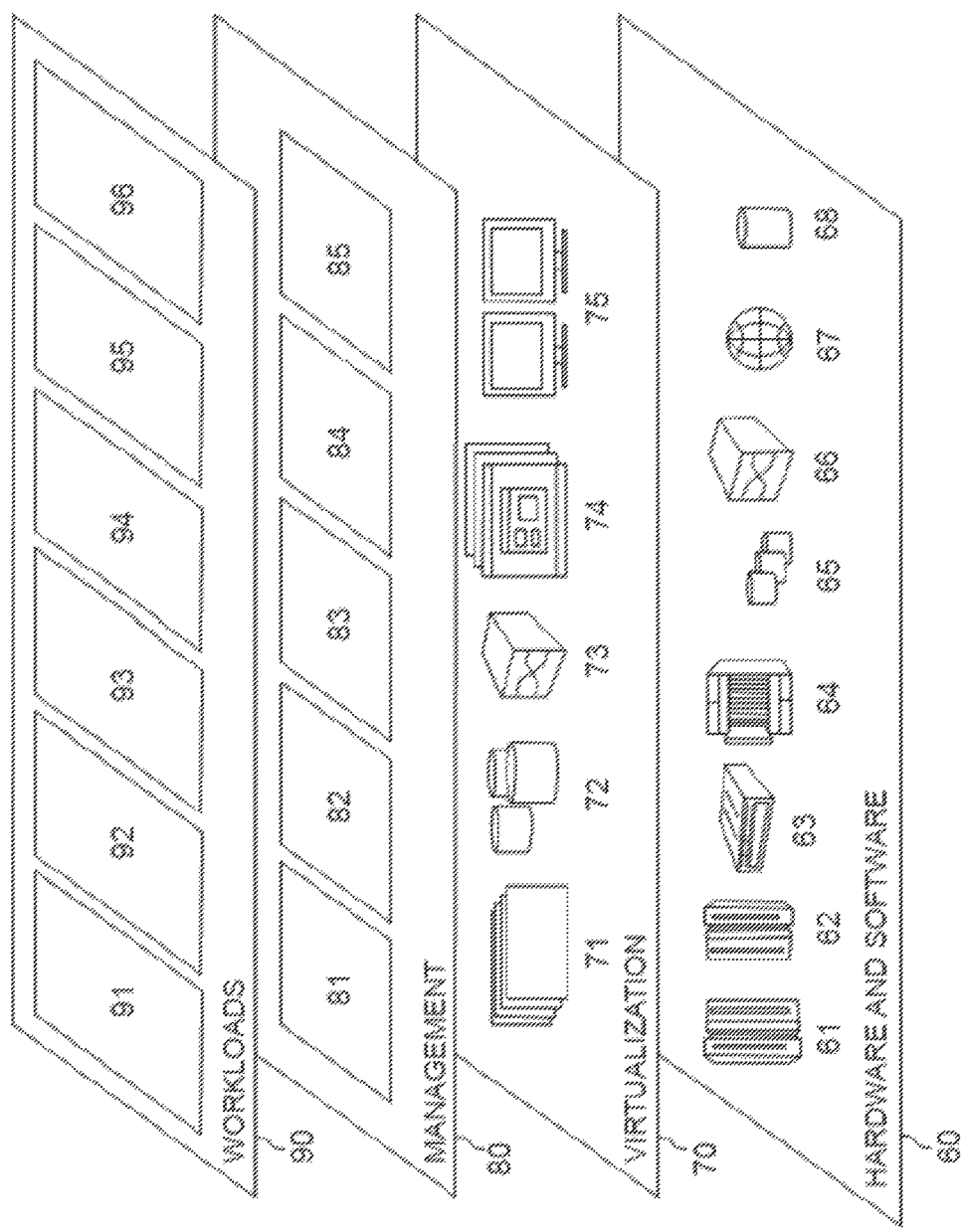
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated gas detection and reporting 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring and detecting a leak, said method comprising:

transiting along a line by a mobile detector having an audio sensor and an odor sensor;

obtaining a sample audio reading by the audio sensor;

obtaining a sample odor reading by the odor sensor;

comparing the sample audio reading to a baseline audio reading to determine whether there is at least one leak in the line;

comparing the sample odor reading to a baseline odor reading to determine whether there is at least one leak in the line;

identifying a location of the mobile detector when at least one leak in the line is detected;

maintaining an electronic database of sample audio readings, sample odor readings, and leak events;

analyzing the electronic database to identify leak trends; and predicting timing and location of future leaks based on said analyzing the electronic database.

2. The method according to claim 1, further comprising sending the sample audio reading and the sample odor reading to a central monitoring center by a communications device on the mobile detector.

3. The method according to claim 2, wherein the sample audio reading includes a frequency and a duration.

4. The method according to claim 1, further comprising:

determining a smell type classification of the sample odor reading; and sending the smell type classification to the central monitoring center by the communications device on the mobile detector.

5. The method according to claim 1, further comprising:

determining leakage flow rates of multiple leaks in the line based on the sample audio reading; and prioritizing repairs of the multiple leaks based on the determined leakage flow rates.

6. The method according to claim 1, wherein the audio sensor includes an array of microphones, and wherein said obtaining of the sample audio reading includes:

pointing the microphones in different directions;

obtaining a sample audio reading in each of the microphones;

identifying the volume of each sample audio reading;

identifying at least one microphone in the array of microphones with an audio reading having the highest volume;

identifying a direction that the identified microphone is pointed towards;

identifying the direction that the identified microphone is pointed towards as the location of the at least one leak.

7. The method according to claim 6, further comprising:

compensating the sample audio readings for each focus point by an associated propagation delay; and summing and normalizing the sample audio readings by the number of microphones in the array of microphones to determine distance to the at least one leak.

8. The method according to claim 1, wherein said comparing of the sample audio reading to the baseline audio reading includes determining presence of at least one leak when the sample audio reading differs from the baseline audio reading by a threshold degree, and wherein said comparing of the sample odor reading to the baseline odor reading includes determining presence of at least one leak when the sample odor reading differs from the baseline odor reading by a threshold degree.

9. The method according to claim 1, wherein said odor sensor includes a tunable diode laser absorption spectrometer (TDLAS), and wherein said obtaining of the sample odor reading includes:

tuning the TDLAS to a gas carried in the line;

directing a laser beam from a laser emitter in the TDLAS towards a sensor in the TDLAS;

identifying presence of the gas when a reduction in intensity of the laser beam is detected; and calculating a concentration of the gas based on the reduction in intensity of the laser beam.

10. The method according to claim 1, wherein said odor sensor includes a conducting polymer gas sensor, and wherein said obtaining of the sample odor reading includes:

detecting an increase in electrical resistance in the conducting polymer gas sensor due to expansion of a polymer composite in the conducting polymer gas sensor, the expansion of a polymer composite being caused by exposure of the polymer composite to the gas;

measuring the increase in electrical resistance;

translating the measured increase in electrical resistance into a voltage level change through a circuit in the conducting polymer gas sensor; and calculating the concentration of the gas based on the voltage level change.

11. The method according to claim 1, further comprising:

obtaining a sample temperature reading by a thermometer on the mobile detector;

comparing the sample temperature reading to a baseline temperature reading; and determining presence of at least one leak when the sample temperature reading exceeds the baseline temperature by a threshold level.

12. A method for monitoring and detecting a leak, said method comprising:

transiting along a line by a mobile detector having an audio sensor and an odor sensor;

obtaining a sample audio reading by the audio sensor;

obtaining a sample odor reading by the odor sensor;

obtaining a sample humidity reading by a hygrometer on the mobile detector;

comparing the sample audio reading to a baseline audio reading to determine whether there is at least one leak in the line;

comparing the sample odor reading to a baseline odor reading to determine whether there is at least one leak in the line;

comparing the sample humidity reading to a baseline humidity reading;

determining presence of at least one leak when the sample humidity reading exceeds the baseline humidity reading by a threshold level; and identifying a location of the mobile detector when the line is determined to have at least one leak.

13. A method for monitoring and detecting a leak, said method comprising:

transiting along a line by a mobile detector having an audio sensor and an odor sensor;

obtaining a sample audio reading by the audio sensor;

obtaining a sample odor reading by the odor sensor;

comparing the sample audio reading to a baseline audio reading to determine whether the line is leaking;

comparing the sample odor reading to a baseline odor reading to determine whether the line is leaking;

identifying a location of the mobile detector by a GPS device on the mobile detector when the line is determined to be leaking;

sending the location of the mobile detector, the sample audio reading, and the sample odor reading to a central monitoring center by a communications device on the mobile detector, the sample audio reading includes a frequency and a duration;

maintaining an electronic database of sample audio readings, sample odor readings, and leak events;

analyzing the electronic database to identify leak trends; and predicting timing and location of future leaks based on said analyzing the electronic database.

14. The method according to claim 13, further comprising:
determining a smell type classification of the sample odor reading; and
sending the smell type classification to the central monitoring center by the communications device on the mobile detector.

15. The method according to claim 13, further comprising:
determining leakage flow rates of multiple leaks in the line based on the sample audio reading; and
prioritizing repairs of the multiple leaks based on the determined leakage flow rates.

16. The method according to claim 13, wherein the audio sensor includes an array of microphones, and wherein said obtaining of the sample audio reading includes:
pointing the microphones in different directions;
obtaining a sample audio reading in each of the microphones;
identifying the volume of each sample audio reading;
identifying a microphone in the array of microphones with an audio reading having the highest volume;
identifying a direction that the identified microphone is pointed towards;
identifying the direction that the identified microphone is pointed towards as the location of a leak.

17. The method according to claim 16, further comprising:
compensating the sample audio readings for each focus point by an associated propagation delay; and
summing and normalizing the sample audio readings by the number of microphones in the array of microphones to determine distance to a leak.

18. The method according to claim 13, further comprising:
obtaining a sample temperature reading by a thermometer on the mobile detector;
comparing the sample temperature reading to a baseline temperature reading;
obtaining a sample humidity reading by a hygrometer on the mobile detector;
comparing the sample humidity reading to a baseline humidity reading; and
determining presence of a leak when the sample humidity reading exceeds the baseline humidity reading by a threshold level and when the sample temperature reading exceeds the baseline temperature by a threshold level.

19. A computer program product for monitoring and detecting leaks, said computer program product comprising:
a computer readable storage medium having stored thereon:
first program instructions executable by a device to cause the device to transit along a line;
second program instructions executable by the device to cause the device to obtain a sample audio reading;
third program instructions executable by the device to cause the device to obtain a sample odor reading;
fourth program instructions executable by the device to cause the device to compare the sample audio reading to a baseline audio reading to determine whether there is a leak in the line;
fifth program instructions executable by the device to cause the device to compare the sample odor reading to a baseline odor reading to determine whether there is a leak in the line;
sixth program instructions executable by the device to cause the device to identify a location of the device when the device determines that there is a leak in the line;
seventh program instructions executable by the device to cause the device to maintain an electronic database of sample audio readings, sample odor readings, and leak events;
eighth program instructions executable by the device to cause the device to analyze the electronic database to identify leak trends;
ninth program instructions executable by the device to cause the device to predict timing and location of future leaks based on analysis of the electronic database; and
tenth program instructions executable by the device to cause the device to send the location of the device to a central monitoring center.

* * * * *